W. A. SNOOK.
MOLD FOR MAKING RUBBER ARTICLES.
APPLICATION FILED MAY 23, 1921.
1,410,615.
Patented Mar. 28, 1922.
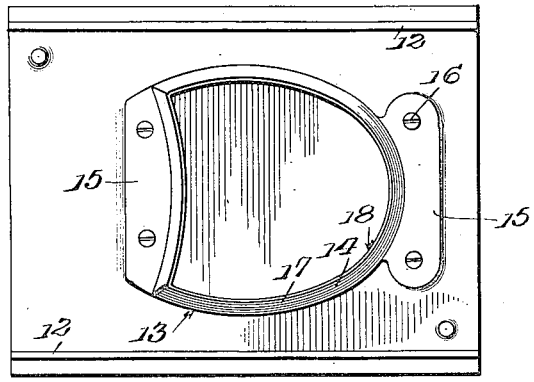
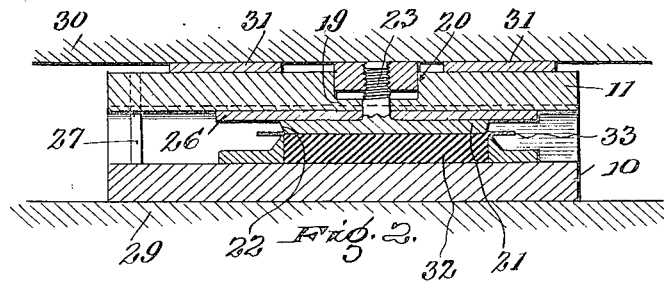
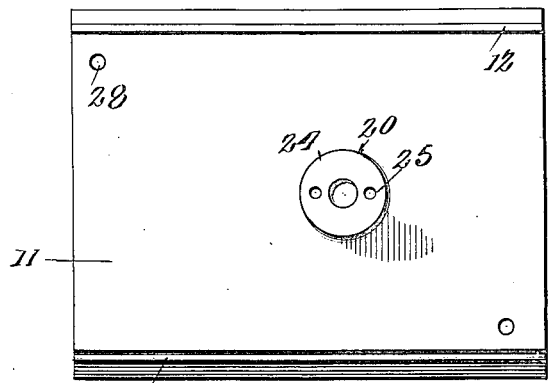
Wilbur A. Snook
INVENTOR
BY ATTORNEY

UNITED STATES PATENT OFFICE.

WILBUR AMOS SNOOK, OF TRENTON, NEW JERSEY.

MOLD FOR MAKING RUBBER ARTICLES.

1,410,615.

Specification of Letters Patent. Patented Mar. 28, 1922.

Application filed May 23, 1921. Serial No. 471,666.

*To all whom it may concern:*

Be it known that I, WILBUR AMOS SNOOK, a citizen of the United States, residing at Trenton, in the county of Mercer and State of New Jersey, have invented certain new and useful Improvements in Molds for Making Rubber Articles, of which the following is a specification.

This invention has relation to molds for making rubber articles, and has for an object to provide a mold particularly adapted for making rubber heels for shoes by virtue of which the excess rubber which is forced from the edges of the mold may be trimmed away during the process of compressing the rubber into the mold, thus obviating the necessity of trimming the heels by hand as in the method heretofore employed.

Another object of the invention is to provide a mold for making rubber heels which consists of a mold cavity to receive the raw stock, a core to press the stock into the mold and a novel mounting for the core whereby the amount of pressure to be applied may be altered at will.

In addition to the foregoing, this invention comprehends improvements in the details of construction and arrangement of parts to be hereinafter described and particularly set forth in the appended claims.

In the accompanying drawings in which similar and corresponding parts are designated by the same characters of reference throughout the several views in which they appear.

Figure 1 is a view in top plan of the cavity portion of my improved mold.

Figure 2 is a view in longitudinal section of the mold in operative relation, and Figure 3 is a view in top plan of the core part of the mold.

With reference to the drawings, 10 indicates the bottom plate and 11 the upper movable plate. A pair of guide flanges 12 are formed on the bottom plate, between which the upper plate operates and to prevent lateral movement of the latter. A mold proper indicated at 13 is mounted on the bottom plate and consists of a wall 14 having the outline of a heel, end extensions 15 being formed thereon and said extensions perforated to receive suitable fastenings such as screws 16. The space within the wall thus constitutes the mold cavity and the surface of the plate 10 the bottom of said cavity. The top surface of the wall 14 is beveled downward upon the outer side as at 17 defining a cutting edge 18 upon the inner periphery of the wall. The upper plate is formed with an opening 19 and the top surface of the plate is counter bored around the opening to form the recess 20. A core 21 is provided and consists of a plate conforming to the shape of the mold cavity and of a size to partly enter the same, the edges around the underside being preferably slightly rounded as at 22. A threaded stud 23 is formed on said core plate to enter the opening 19, and a nut 24 is applied to said stud. It will be noted that the nut 24 is circular in configuration and is of a size to enter and snugly fit the recess 20, opposed openings 25 being formed in its top surface to permit the application of a spanner wrench. A spacing plate 26 is interposed between the core plate and the upper plate 11 and is formed with an aperture to receive the stud 23. An additional guiding may be adapted in the form of pins 27 upstanding from the bottom plate to enter openings 28 of the upper plate.

In accordance with the conventional method of making rubber articles, and particularly rubber heels the raw stock is pressed into the mold cavity and then vulcanized during which process surplus stock is squeezed out around the edges of the mold and adheres to the article when the latter is removed from the mold, thus leaving an irregular edge which heretofore has always been trimmed away by hand through the medium of an ordinary pair of shears. It is therefore the object of the present invention to eliminate this manual trimming and to accomplish the same while the articles are still in the mold. To this end the raw stock is placed in the cavity within the wall 14 and the top plate 11 superposed upon the bottom plate and the two plates inserted in a hydraulic press of which the bed is indicated at 29 in Figure 2 and the movable head at 30. Previously however the nut 24 should be so adjusted that slight vertical play of the core plate 21 may be possible. Then a number of spacing bars 31 are inserted between the head 30 of the press and the upper plate 11 of the mold. The head of the press is now permitted to descend forcing down the upper plate 11 and consequently forcing the core plate 21 into the mold with the result that the raw stock, indicated at 32 is compressed and the surplus squeezed out around the edges of the mold forming the thin irregular margin 33. When the requisite amount of pressure has been applied the parts are held in this position and the mold is heated to vulcanize the rubber in the usual manner. When the rubber has been sufficiently vulcanized the head of the press is raised slightly and the spacer bars 31 are removed, and the press head again permitted to descend. Since the nut 24 extends slightly above the surface of the plate 11 and the bars 31 are removed the nut 24 will be first engaged by the press head and forced downward. As a result the core plate moves down pressing the margin 33 or excess stock of the rubber heel against the edge 18 of the wall 14 thus shearing off said margin or excess stock neatly and uniformly so that when the heel is removed from the mold cavity it will be perfect and complete. It is understood that in practice the bottom plate 10 will be much larger than shown and will contain a number of mold cavities, and the upper plate 11 will be correspondingly larger and contain a corresponding number of core plates, substantially in the same manner that these plates are employed at present, each plate containing from twenty to thirty cavities. I have only illustrated one unit in the drawings in order to simplify the description. Thus, it will be seen that a great saving of time will be ensured by the use of this improved mold since the entire batch of heels will be trimmed simultaneously. It will also be noted that since the nut 24 may be adjusted along the stud the core plate may be caused to enter the cavity to a greater or less degree thus permitting the pressure upon the stock to be varied by this means without altering the amount of travel of the head of the press. This feature is important since the pressure must vary according to the quality of the raw stock. Other uses and advantages will readily occur to those skilled in the art to which this invention appertains.

While I have illustrated and described my invention with some degree of particularity I realize that in practise various alterations therein may be made. I therefore reserve the right and privilege of changing the details of construction or otherwise altering the arrangement of the parts without departing from the spirit of the invention or the scope of the appended claims.

Having thus described my invention what I claim as new and desire to secure by United States Letters Patent is:

1. A mold for making rubber articles including a stationary member having a cavity, and an adjustable complemental member to enter the cavity, said members being formed to trim away surplus stock which may be squeezed from the cavity.

2. A mold for making rubber articles including a stationary member having a cavity the wall of which is formed with a sharpened edge, and an adjustable complemental member to enter the cavity and to press any surplus stock issuing from the mold against the sharpened edge so that said surplus stock may be thus sheared off.

3. A mold for making rubber articles including a stationary member having a cavity, a movable carrier, and a complemental member supported by the carrier and adapted to enter the mold, said second member having slight movement relative to the carrier and toward and away from the cavity.

4. A mold for making rubber articles including a stationary member having a cavity, a movable carrier, a complemental member to enter the cavity, means for supporting said second member from the carrier, to permit slight movement of said second member relative to the carrier, and a means to vary the amount of movement permitted.

5. A mold for making rubber articles including a stationary member having a cavity, a movable plate having an opening, a complemental member to enter the cavity, a threaded stud on said plate to enter the opening, said opening being counter bored to form a recess, and a nut applied to the stud and operating in the recess.

6. A mold for making rubber articles including a stationary plate, a pair of guides thereon, a movable plate operating between the guides, a mold mounted on the stationary plate having a sharpened edge, the movable plate having and said opening being counterbored to form a recess on the top side of said plate, a complemental member to enter the mold and having a beveled edge, a threaded stud on said member to enter the opening, and a nut applied to the stud and operating in the recess.

7. The hereindescribed method of making rubber articles which consists in first compressing the raw stock in a mold to a predetermined degree whereby the excess stock is squeezed out around the edges of the mold, second vulcanizing the stock, and finally subjecting the article while still in the mold to a further and greater compression whereby to sever the margin of excess stock from the article by engagement between the edges of the mold and pressing member.

In testimony whereof I affix my signature in presence of two witnesses.

WILBUR AMOS SNOOK.

Witnesses:
WM. ZEAMAN,
JOHN I. BAKER.